United States Patent [19]

Warner et al.

[11] Patent Number: 4,792,031
[45] Date of Patent: Dec. 20, 1988

[54] FILLER COLLAR FOR MULTIPLE SCALE WEIGHING SYSTEM

[75] Inventors: William L. Warner, Grayson; William A. Hadden, Conyers, both of Ga.

[73] Assignee: Kliklok Corporation, Decatur, Ga.

[21] Appl. No.: 534,576

[22] Filed: Sep. 21, 1983

[51] Int. Cl.[4] ............................................. B65G 11/00
[52] U.S. Cl. .................................... 193/2 R; 141/339; 222/564
[58] Field of Search ............... 193/2 R; 239/403, 489; 53/248, 255; 141/365, 338, 339, 106; 222/547, 567

[56] References Cited

U.S. PATENT DOCUMENTS

| | | | |
|---|---|---|---|
| 300,691 | 6/1884 | Brown | 141/339 |
| 1,265,381 | 5/1918 | Ramey | 141/339 |
| 1,662,147 | 3/1928 | Farden | 141/339 |
| 2,174,228 | 9/1939 | Perkins | 141/339 |
| 2,250,910 | 7/1941 | Hiett | 141/339 X |

FOREIGN PATENT DOCUMENTS 619539  4/1927  France ................................ 141/338

Primary Examiner—Robert J. Spar
Assistant Examiner—Cheryl L. Gastineau
Attorney, Agent, or Firm—King & Schickli

[57] ABSTRACT

An improved product filler collar is provided including an upper funnel portion for receiving charges of product from separate sources, guide ribs on the funnel portion for directing and controlling product flow and a neck portion for forming a single stream of product for filling a package or the like. The guide ribs may take the form of raised flanges forming a wall to confine relatively large product pieces. The flanges terminate in reduced extensions in the neck portion angled slightly back toward the product flow. The filler collar eliminates the bridging and swirling of product to prevent jams and decrease the residence time of the changes within the collar, thus improving the overall efficiency of the packaging operation.

14 Claims, 5 Drawing Sheets

FILLER COLLAR FOR MULTIPLE SCALE WEIGHING SYSTEM

TECHNICAL FIELD

The present invention relates generally to devices for directing and controlling the flow of a comminuted solid or bulk product, and more particularly, to a product filler collar for receiving bulk material charges from multiple sources and combining those charges into a single stream while eliminating material swirling and bridging to improve overall flow.

BACKGROUND OF THE INVENTION

Inlet funnels for single scale packaging machines are well known in the prior art. The funnel is an inverted, truncated hollow cone tapering into a package filling tube. The devices are quite simple and are particularly useful in directing the flow of a product into a small opening associated with the container being formed by the packaging machine.

In the highly automated packaging world of today, however, multiple scale machines representing the forefront of technology are being introduced. In these advanced machines, a precise weight of product is obtained by selecting and simultaneously dispensing a combination of separate, weighed charges of product. These charges are conveyed along discrete pathways and discharged at different points along the upper periphery of a funnel that directs the charges into a package A funnel receiving separate charges traveling at high speed and entering from different locations, however, induces a swirling motion that inhibits the flow of the product through the funnel. Specifically, the swirling may be so strong that a hole, not unlike the eye associated with a whirlpool, is initially formed at the center of the product so that only that portion immediately adjacent the exit opening of the funnel readily feeds into the filling tube below. This means that a large area of the exit opening that could be used to speed the discharge of the product remains unused until the product slows sufficiently to stop the swirling. Additionally, once the product does slow the separate charges tend to collide at the exit opening and stick, wedge or bridge across that opening to further impede flow. Therefore, the problem of product swirling, and the bridging characteristic of a funnel when receiving charges from separate sources, needs to be addressed and corrected if full advantage of the increased productivity available with these advanced multiple scale weighing and packaging machines is to be obtained.

U.S. Pat. Nos. 1,662,147 to Farden and 2,174,228 to Perkins disclose funnels specifically designed to control the swirling and splashing associated with the passage of a liquid product therethrough. The Farden design is substantially a funnel within a funnel, the inner funnel containing inwardly extending flanges and corresponding openings. The Perkins design includes a rigid flange, the inner edge of which is rolled or bent downward to form a lip that projects inwardly from the upper edge or rim of the funnel body. A pair of spaced baffles or vanes are fixed to the inner surface of the funnel body and extend radially from a point near the inner edge of the spout to the flange.

Both of these designs deal with increasing the free flow of a liquid through a funnel and are not intended for application to and will not significantly improve the free flow of solid charges from multiple sources. Indeed, if used for multiple bulk product flow the Farden device would inevitably lead to bridging jams in the neck of the funnel since the product is guided straight down where it collides and sticks or wedges together. Perkins on the other hand is drawn to a funnel design clearly limited to directing a single flow between the two baffles and therefore, is also not analagous to the present invention.

In fact, the possibility of multiple charges being emptied into a funnel from separate sources is not considered in this prior art. Thus, the problem of multiple source bulk product swirling and bridging that deleteriously affects product flow is considered to be, as yet, unanswered in the art.

SUMMARY OF THE INVENTION

Accordingly, it is the primary object of the present invention to provide a product filler collar overcoming the above-identified limitations and disadvantages of the prior art.

Another object of the present invention is to provide a product filler collar for directing and controlling product flow to eliminate product bridging and swirling.

An additional object of the present invention is to provide a product filler collar capable of receiving product flow from a plurality of separate sources and efficiently directing that flow into a single controlled stream.

Still another object of the present invention is to provide a product filler collar for directing and controlling product flow from different hoppers or scales in such a way as to force all the charges to follow paths of the same length, thereby eliminating swirling and bridging while decreasing the residence time of the charges within the funnel.

Additional objects, advantages and other novel features of the invention will be set forth in part in the description that follows and in part will become apparent to those skilled in the art upon examination of the following or may be learned with practice o the invention. The objects and advantages of the invention may be realized and attained by means of the instrumentalities and combinations particularly pointed out in the appended claims.

To achieve the foregoing and other objects in accordance with the purposes of the present invention as described herein, an improved apparatus is provided for receiving multiple bulk material charges from separate sources, directing and controlling the flow of those charges to eliminate bridging and swirling so as to decrease the residence time of the material in the hopper, and finally combining those charges into a single product stream, such as for filling a package. The filler collar of the invention includes an upper funnel portion having a substantially continuous surface to receive product charges, guide ribs provided on the funnel portion to direct and control product flow, particularly where it originates from a plurality of different scales or hoppers, and a neck portion to form the single stream.

The preferred slope angle of the funnel portion is approximately 40°. Such an angle imparts smooth downward acceleration to full velocity of the product in an efficient, controlled manner while preventing product from simultaneously collecting and jamming across the exit opening. Preferably, the guide ribs are positioned at an acute angle with respect to the radius of the collar to force all the charges from the multiple sources, such as various hoppers of a multiple scale weighing apparatus, to follow paths of the same length. More specifically, the guide ribs extend in spaced relationship to each other on the inner surface of the funnel portion along lines substantially tangential with respect to the mouth of the neck portion. Any two adjacent guide ribs define an angle of substantially 40° therebetween.

Where the flow of heavier bulk materials such as cookies, candies or nuts, is to be directed, there is a special need for a relatively tall wall or flange to confine and direct the more rapidly moving and larger product and prevent swirling. In order to meet this need, the filler collar may include raised flanges in lie of the guide ribs, extending downwardly along the collar and into the neck portion of the funnel. This additional control and guiding action for this different type of product, along the collar and as the product begins the descent through the neck of the collar, serves to further assure the efficiency and high speed of the packaging operation. This is accomplished by properly channeling the product along the proper path and eliminating the possibility of the heavier product riding up and over lower profile guide ribs.

Preferably, the flanges for directing these heavier bulk products are spaced further apart in order to open up the product filler collar for better product flow into and through the mouth thereof. Typically, flanges are positioned adjacent alternate product chutes. The flange extends straight down along the interior surface of the funnel and curves slightly back as it extends down into the neck portion. This extension serves to further block excessive swirling and other deleterious action of the product flow, while alleviating the possibility of bridging of the product at the mouth.

Still other objects of the present invention will become readily apparent to those skilled in this art from the following description wherein there is shown and described a preferred embodiment of the invention, simply by way of illustration of one of the modes best suited to carry out the invention. As it will be realized, the invention is capable of still other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiments of the invention, examples of which are illustrated in the accompanying drawing.

DETAILED DESCRIPTION OF THE INVENTION

Figure 1:
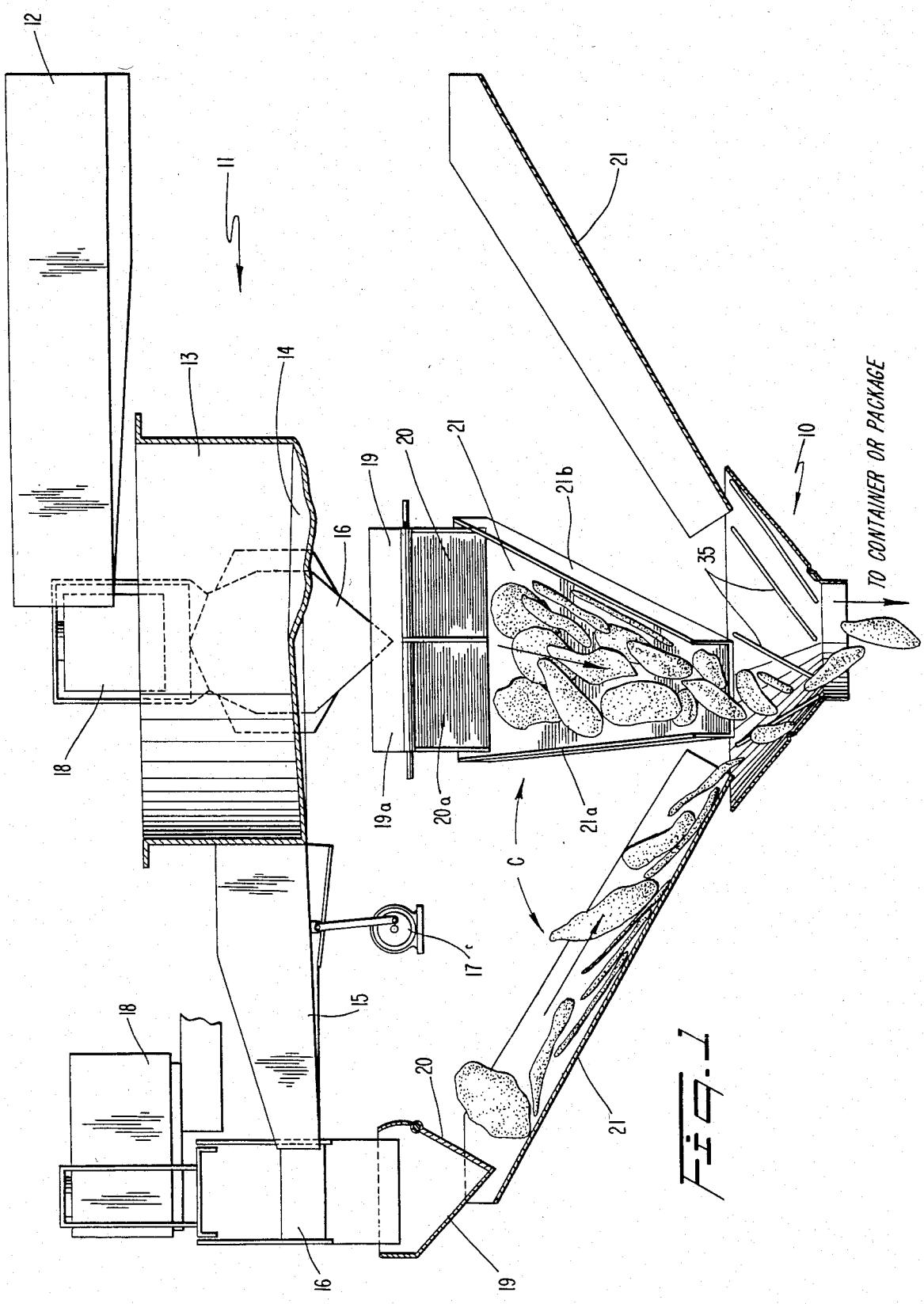
FIG. 1 is a cross-sectional view of the product filler collar of the present invention receiving a solid product flow simultaneously from two separate distribution chutes of a multiple scale packaging apparatus.

Reference is now made to FIG. 1 showing an improved product filler collar 10 of the present invention mounted on a multiple scale packaging apparatus 11. The collar 10 is preferably circular and directs and controls product C from a series of circularly arranged scales and cooperating chutes (see FIGS. 1 and 4) to an underlying package or container (not shown). In the preferred embodiments, the filler collar 10 is formed of metal, such as stainless steel, although other suitable materials, such as plastic may be used.

As shown in FIG. 1, the multiple scale packaging apparatus 11 includes a main vibrating feedhopper or bin 12 wherein a bulk solid product, for example potato chips, is stored and fed for packaging. A distributor 13 with vertically oriented walls is provided with an opening at the top for receiving the potato chips from the bin 12.

A conical member 14 is rotatably disposed within the distributor 13 to dispense the product through a plurality of openings provided in the peripheral structure of the distributor. Each of these openings leads to a vibrating conveyor 15 that directs the product radially outward from the distributor 13 to one of a series of weighing hoppers 16. For simplification purposes, only one chute 15 and two hoppers 16 are shown in FIG. 1. It should be appreciated, however, that any number of cooperating chutes 15 and hoppers 16 may be provided around distributor 13. A vibrator motor 17 is connected to each conveyor 15 to insure flow of potato chips along conveyor 15 from the distributor 13 to the cooperating hopper 16.

Each hopper 16 is connected to a scale 18. The scale 18 weighs and records the weight of the product charge within the hopper 16. The charge is then deposited from each hopper 16 into an available one of a pair of storage cups 19, 19a. The potato chips are retained in the storage cups 19 until released through doors 20, 20a to slide down respective chutes 21, each having an outer side wall 21a and an inner side wlll 21b for retaining the charge on the chute. It should be realized that charges from more than one of the storage cups 19 (preferably three) are required to provide the desired weight of product in the final package. Thus, typically, separate charges are simultaneously released from the storage cups 19 to slide down the chutes 21 into collar 10. The filler collar 10 then directs the separate charges of potato chips C into a single stream for filling an underlying package or container (not shown).

The multiple scale packaging machine shown is similar to that described in the co-pending application entitled Method and Apparatus for Combination Weighing, Ser. No. 344,630, filed Feb. 1, 1982, now U.S. Pat. No. 4,418,771, and assigned to the present assignee. It should be understood, however, that the multiple scale packaging machine forms no part of this invention. It is described only to illustrate the applicability of the product filler collar of the present invention to state of the art distribution and packaging machinery.

Figure 2:
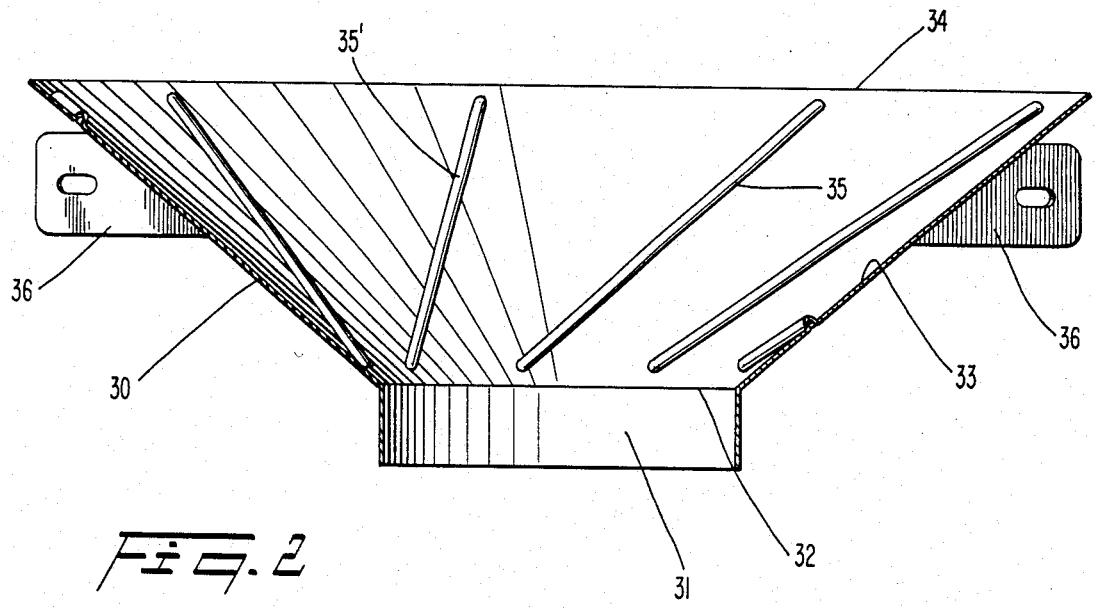
FIG. 2 is a cross-sectional view of one embodiment of the present invention taken along the center line of FIG. 4.
Figure 3:
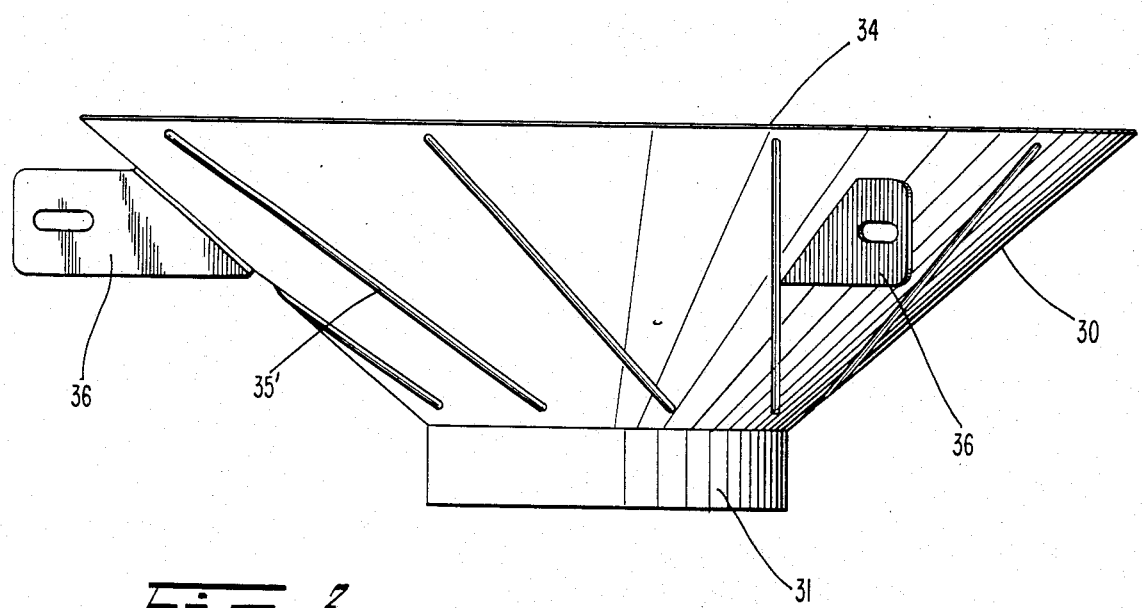
FIG. 3 is a side elevational view of the product filler collar of the present invention.

As can be seen from viewing FIGS. 2 and 3, the product filler collar 10 of the present invention includes an upper cone-shaped funnel portion 30 having a substantially continuous surface for receiving charges of product from multiple sources, such as chutes 21 shown in FIG. 1. Funnel portion 30 tapers downwardly into neck portion 31 for connection to the filling tube of the packaging machine (not shown). Neck portion 31 defines mouth 32 at the juncture with the funnel portion 30 (see FIGS. 2 and 4). The mouth 32 merges the product C into a single stream for delivering to the container or package below. The inner surface 33 of funnel portion 30 slopes inwardly and downwardly from upper lip 34 to the mouth 32 defined by neck portion 31. Preferably, the downward slope of inner surface 33 is at an angle of 40° to the horizontal. Such an angle provides sufficient acceleration of the product to assure smooth, swift flow, but is not so great as to cause the uncontrolled jarring or bouncing that leads to a damaged product.

Guide ribs 35, 35' are provided in spaced relation along the inner surface 33 and have sufficient height above the surface to prevent the product from flowing over the ribs. The ribs, 35' 35, thus direct the inward flow of product charges from the chutes 21 down the inner surface 33 of funnel portion 30 to mouth 32 for merging into single stream discharge into a container.

The ribs 35, 35' are preferrably embossed in the surface 33 of the funnel, as shown in the drawing. However, the ribs may also be formed by a suitable drawing or rolling process, or by welding properly sized bar stock on the surface. If the filler collar 10 is cast, either of metal or plastic, the ribs may be integrally formed in the surface.

Preferably, the ribs 35, 35' are positioned along funnel portion 30 so that any two adjacent ribs define a 40° angle therebetween. Such positioning maximizes the preventive effect the ribs 35, 35' have on the product bridging and swirling so characteristic of inlet funnels when simultaneously receiving separate charges from discrete sources.

Figure 4:
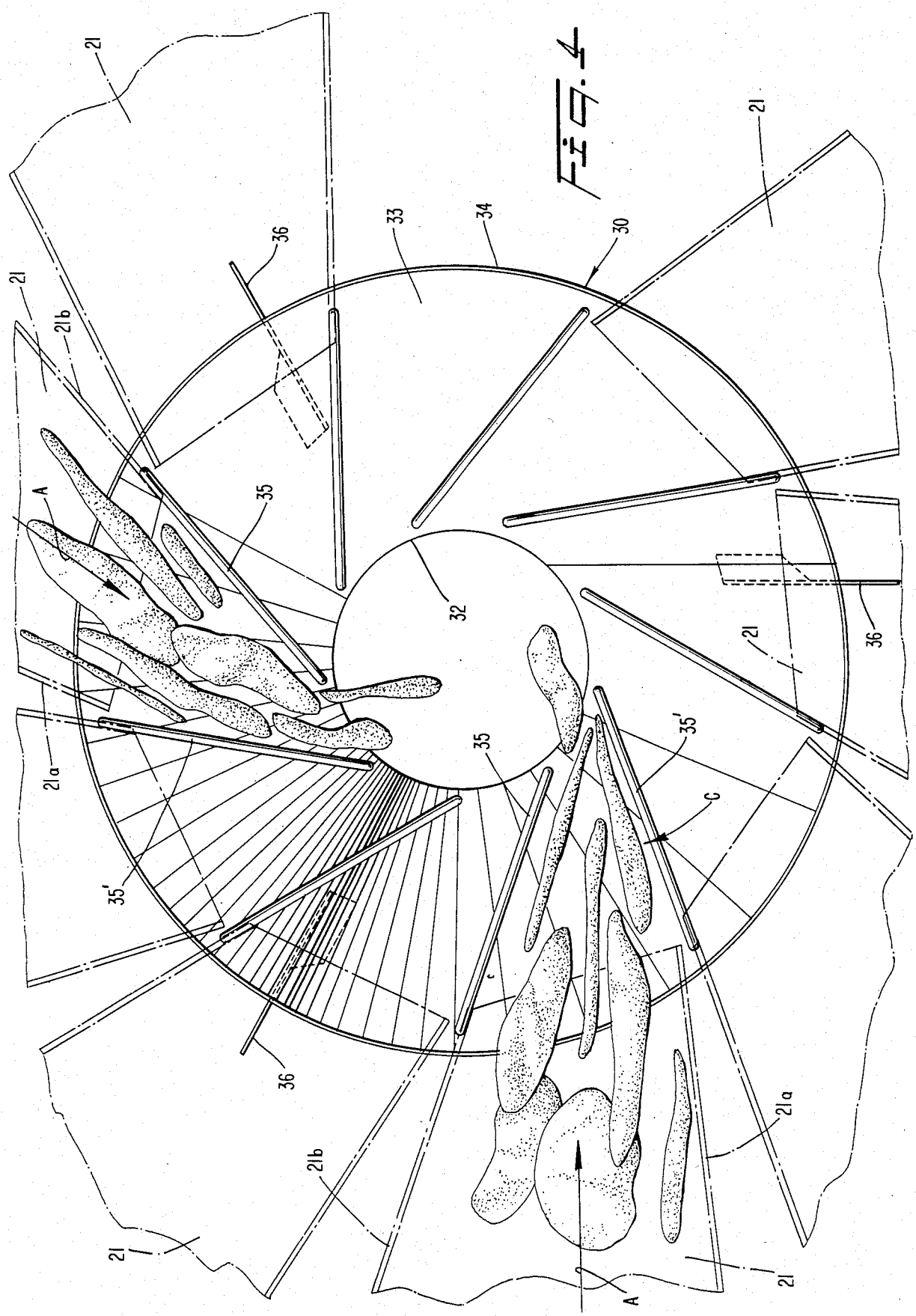
FIG. 4 is a top plan view showing the product filler collar of the present invention and the flow of a bulk solid material; such as potato chips or the like, therethrough.

As seen from viewing FIGS. 1 and 4 together, charges of product C, such as potato chips, are conveyed down chutes 21 in the direction of arrow A to enter funnel portion 30 at an angle approximately the tangent to the mouth 32 (i.e. on a chordal discharge path). Upon entering the funnel, one guide rib 35, continues to direct the flow of product C along a path substantially tangential with respect to mouth 32. The product is guided in this direction from above since the inner wall 21b of the chute 21 is substantially aligned with the rib 35 (see FIG. 4). This prevents the product C from wedging, sticking and bridging across the mouth 32, as commonly occurs when multiple bulk product streams are allowed to pass straight down the funnel to the opening. Also, the guiding action prevents deleterious breakage of the product C by minimizing collisions at the mouth 32. This smooth merging and interdigitating action of the product as the streams come together enhances the speed and reliability of the filling process, thus providing substantial benefit and savings to the packaging machine user.

A second guide rib, designated by the reference numeral 35' for clarity of illustration, extends toward guide rib 35 at an angle of substantially 40° across the path of flow of chips C. Rib 35' redirects and guides the potato chips C to follow a path directly down mouth 32 to an underlying package and prevents the chips from swirling in the funnel 10.

Figure 5:
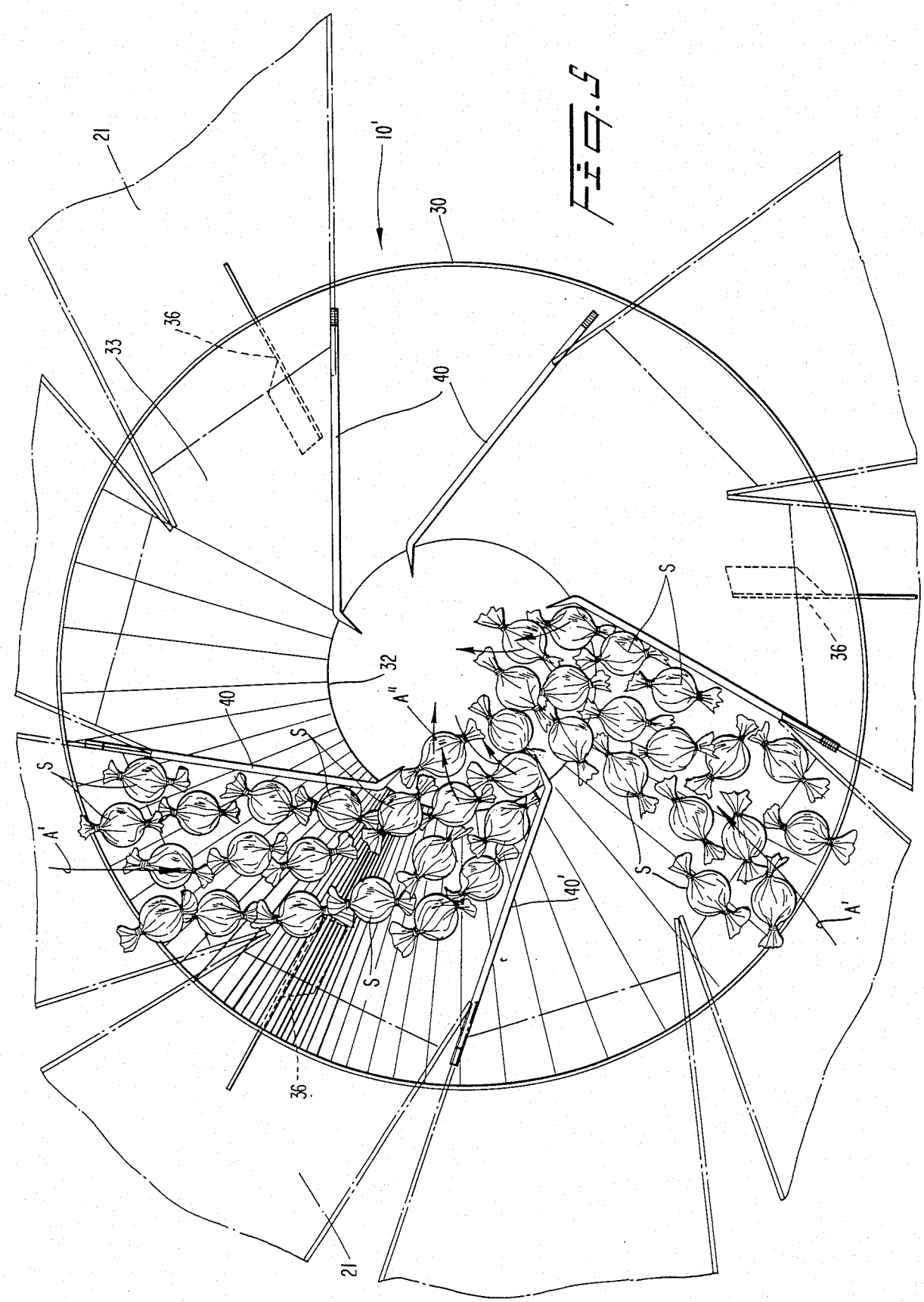
FIG. 5 is a top plan view showing an additional embodiment of the product filler collar of the present invention and the flow of a bulk solid material, such as wrapped candies, therethrough.
Figure 6:
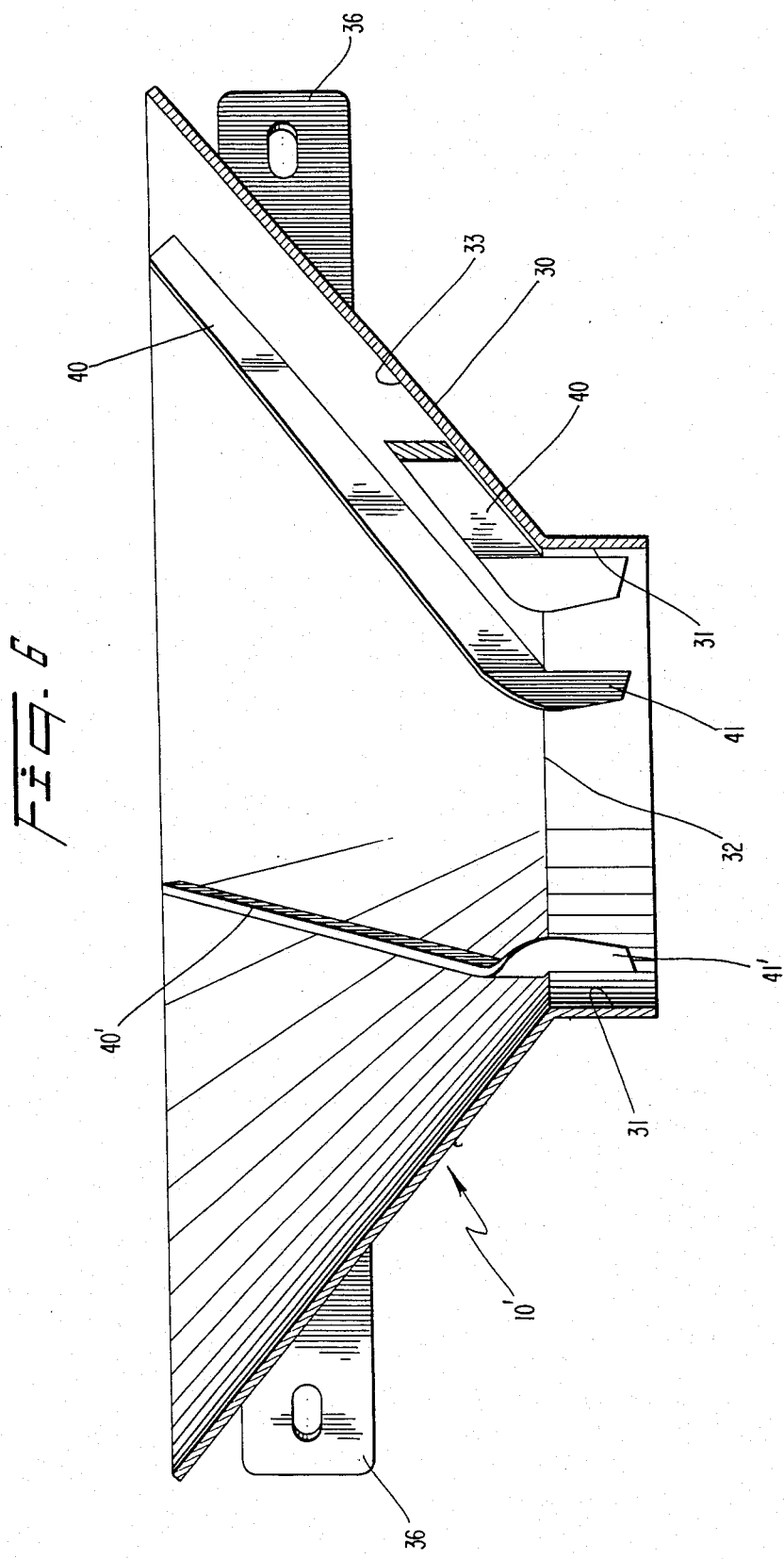
FIG. 6 is a cross-sectional view of the additional embodiment of the present invention taken along the center line of FIG. 5.

The guide ribs 35, 35' for directing product flow on filler collar 10 of the present invention force separate charges from discrete sources to follow paths of the same length in reaching mouth 32. The ribs 35, 35' guide the charges along a downwardly sloping and gently curving path to the mouth 32 so that the entire area of that opening is available to increase the flow speed of the charges and improve packaging efficiency.

Where heavier and larger component bulk material, such as candies, cookies, nuts or the like, is to be directed by the product filler collar 10', the guide ribs may take the form of raised flanges 40, 40' (see FIGS. 5 and 6). The flanges 40, 40' extend upwardly from the inner surface 33 of the funnel portion 30 a sufficient distance to form a barrier encouraging proper flow (see arrow A') while preventing the product from crossing over into an adjacent path and excessively swirling through the collar 10'. As shown, the flanges 40, 40' are formed of sheet metal or the like, suitably welded or otherwise attached along their edge to the upper surface of the collar 10' so as to extend substantially vertically upwardly. In a typical installation for handling wrapped, bite size candy, such as sour balls S, an approximately 1 inch flange is selected to maximize the control while minimizing the required depth of the collar 10'.

The flanges 40, 40' are spaced further apart than the guide ribs 35, 35' of the previous embodiment in order to open up the funnel portion 30 for better product merging and flow of the larger pieces. Thus, the flanges 40, 40' may be positioned to receive product flow from two adjacent chutes 21 rather than only one, as previously shown in the earlier embodiment. The two adjacent chutes 1 are preferably fed with product from adjacent scales 18. As set forth in the copending application, Ser. No. 344,630 mentioned above, there is a preference in the compute selection that both holding cups 19, 19a are not selected on a single cycle. Thus, normally only two charges are entering the collar 10' between any one pair of flanges 40, 40'. The open spacing where each intermediate rib is thus omitted is found to easily accommodate the flow of this larger product and provide maximum product filling efficiency.

The flanges 40, 40' bend downwardly at the mouth 32 and extend along the neck portion 31 of the collar 10'. These flange extensions 41, 41' further direct the separate product charges and force them downward through the mouth 32 in a smooth efficient manner (note flow arrows A") further minimizing the residence time of the product along the flow paths. The bend of the flange extensions 41,4", at the mouth 32 is back toward the product flow so as to redirect the product (candy S, FIG. 5) more directly downward through the neck 31, thus reducing the swirling motion of the product at this point along the flow path. This also provides better merging with the flow entering along the adjacent path (see FIG. 5). Preferably, the flange extensions 41, 41' are tapered and reduced in height to about three-fourths inch. This insures against any substantial tendency for bridging of the product in the mouth 32.

The foregoing description of the preferred embodiments of the invention has been presented for purposes of illustration and description. It is not intended to be exhaustive or to limit the invention to the precise form disclosed. Obvious modifications or variations are possible in light of the above teachings. As shown, the collars 10, 10' may be mounted to the packaging machine 11 by means of mounting brackets or wings 36. It should be recognized, however, that any suitable means for mounting could be used.

Additionally, sufficient pairs of ribs 35, 35' or flanges 40, 40' are shown to handle eight streams of product C from eight scales 18 and chutes 21 (see FIGS. 4 and 5). Clearly more or less streams may be accommodated, as desired, with any particular packaging machine. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. An improved product filler collar, comprising:
   an upper funnel portion having a substantially continuous surface for receiving multiple charges of bulk solid product;
   a neck portion connected to said funnel portion and defining a mouth; and
   guide ribs disposed in spaced relationship along an inner surface of said funnel portion, said ribs effectively and efficiently directing and controlling product flow from a plurality of separate sources to eliminate bridging and swirling and decrease the residence time of the charges within the filler collar.

2. The product filler collar disclosed in claim 1, wherein each of said guide ribs extends along a line substantially tangential with respect to said mouth.

3. The product filler collar disclosed in claim 2, wherein adjacent guide ribs converge while extending downwardly from an upper lip of said funnel portion to said mouth.

4. The product filler collar disclosed in claim 3, wherein an angle of substantially 40° is defined between any two adjacent guide ribs.

5. The product filler collar disclosed in claim 1, wherein said product filler collar is of substantially circular configuration.

6. The product filler collar disclosed in claim 1, wherein said upper funnel portion slopes downwardly at an angle of substantially 40° from the horizontal.

7. The product filler collar disclosed in claim 1, wherein said sources are chutes extending into said product filler collar at an angle substantially tangential to the mouth, each of said chutes including an inner and outer side wall for directing product flow and one of said guide ribs being aligned with each of said inner side walls.

8. The product filler collar disclosed in claim 1, wherein said guide ribs are positioned to force charges from different sources to follow paths of the same length in reaching said discharge opening.

9. The product filler collar disclosed in claim 1, wherein said guide ribs are embossed in said funnel portion extending from adjacent said mouth to adjacent the top of the collar.

10. An improved product filler collar for conveying a bulk solid product delivered simultaneously from a plurality of sources through a mouth to a package, container or the like, comprising:
    a funnel,
    a plurality of rib-like members disposed in spaced relationship to each other and extending along an inner surface of said funnel about a line substantially tangential with respect to said mouth, thereby directing and controlling product flow along said inner surface of said collar to said mouth while avoiding swirling and bridging of the product in said collar.

11. The product filler collar disclosed in claim 1, wherein said guide ribs are formed by upstanding flanges defining a wall, whereby relatively large product pieces may be controlled in the collar.

12. The product filler collar disclosed in claim 11, wherein said flanges include extensions extending downwardly along said neck portion of said filler collar.

13. The product filler collar disclosed in claim 12, wherein said flange extensions are turned at an angle toward the product flow so as to redirect the product more directly down said neck portion.

14. The product filler collar disclosed in claim 13, wherein the height of the flange extensions along the mouth portion are reduced.

* * * * *